United States Patent [19]

Chamot et al.

[11] Patent Number: 5,427,062

[45] Date of Patent: Jun. 27, 1995

[54] LIQUID COOLING SYSTEM FOR INTERNAL COMBUSTION ENGINE WITH ELECTRONICALLY CONTROLLED FAIL-SAFE TEMPERATURE REGULATION VALVE

[75] Inventors: Jean-Pierre Chamot, Arpajon; Claude Henault, St Forget, both of France

[73] Assignee: Vernet S.A., Ollainville, France

[21] Appl. No.: 221,903

[22] Filed: Apr. 1, 1994

[30] Foreign Application Priority Data

Apr. 5, 1993 [FR] France .................................. 93 03978

[51] Int. Cl.⁶ .................................................. F01P 7/16
[52] U.S. Cl. .................................. 123/41.1; 236/34.5; 236/101 C
[58] Field of Search ................... 123/41.1, 41.01; 236/34, 34.5, 101 C

[56] References Cited

U.S. PATENT DOCUMENTS

| | | | |
|---|---|---|---|
| 4,453,668 | 6/1984 | Abel | 236/34.5 |
| 4,550,693 | 11/1985 | Saur | 236/34.5 |

FOREIGN PATENT DOCUMENTS

| | | |
|---|---|---|
| 0139951 | 5/1985 | European Pat. Off. . |
| 2589219 | 4/1987 | France . |
| 3415876A | 10/1985 | Germany . |
| 3613496 | 10/1987 | Germany . |

*Primary Examiner*—Noah P. Kamen
*Attorney, Agent, or Firm*—Larson and Taylor

[57] ABSTRACT

A cooling circuit comprises a regulating valve, the moving shutoff means of which is actuated by an electric motor the feed current of which is subjected to the action of an electronic control system sensitive to various operating parameters of the internal combustion engine. A safety thermostatic wax capsule is located in a chamber of the valve so as to act on the moving shutoff means so that hot cooling liquid coming from the internal combustion engine is conveyed at least for the most part, towards a radiator only in the case where the temperature of the cooling liquid in the chamber exceeds by a predetermined amount, the temperature for which the electronic system is set.

14 Claims, 3 Drawing Sheets

LIQUID COOLING SYSTEM FOR INTERNAL COMBUSTION ENGINE WITH ELECTRONICALLY CONTROLLED FAIL-SAFE TEMPERATURE REGULATION VALVE

FIELD OF THE INVENTION

The invention relates to liquid cooling circuits, for internal combustion engines, comprising a cooling radiator, a circulation pump and a regulating valve which is mounted on a branch established between a pipeline of the circuit leading the hot cooling liquid which leaves the engine to the radiator and a pipeline of the circuit conveying the cold cooling liquid which leaves the radiator towards the engine, which valve includes, inside a chamber, movable shutoff means set out so that it conveys towards the radiator or directly towards the engine proportions of the flow of hot liquid received by the valve, which proportions vary as a function of the temperature of the liquid at a suitably chosen zone in said chamber and also as a function of at least one other operating parameter.

In order to simplify the terminology, the expressions "hot liquid", "warm liquid" and "cold liquid" are used, given that they actually reflect respective temperature levels during the normal operation of the engine. However, too literal sense should not be attached to these expressions because there are, for example, situations in which the three liquids are at the same temperature (when the engine has been stationary for some time) or in which the so-called "hot" liquid is at a relatively low temperature (starting the engine).

The invention relates more particularly, but not exclusively, to cooling circuits for engines of vehicles such as private cars, public transport vehicles and lorries, and more particularly cooling circuits in which the liquid is used to heat the passenger compartment of these vehicles.

DESCRIPTION OF PRIOR ART

Cooling circuits of the type defined hereinabove have already been described, particularly in document FR-A-2,589,219. In this case, the movable shutoff means of the regulating valve, which in this case is a mixing valve, is actuated by a thermostatic wax capsule housed in the chamber of the valve so as to be sensitive to the temperature of the warm water there; operating parameters other than this temperature, such as the external temperature or the temperature prevailing under the hood of the engine, may have an influence over the operating range of the thermostatic capsule and consequently over the temperature of the water returned to the engine.

It has also been proposed (Document DE-A-3,415,876) to replace the known thermostatic capsule by an electronic system essentially consisting of: a set of sensors which are sensitive to various operating parameters of the engine and capable of emitting signals respectively representing the value of each of these parameters; a computer receiving and processing these signals and capable of generating an electric current taking account of these signals; a reversible electric motor receiving the electric current and comprising a member which can move as a function of the current; and a mechanical transmission connecting the movable member of the electric motor to the movable shutoff means of the regulating valve which, in this case, is not a mixing valve. In the cooling circuit in accordance with this document, in which the regulating valve therefore intentionally has no thermostatic wax capsule, the movable member or rotary output shaft of the electric motor acts, through the use of a cam, on a rod carrying the shutoff means which consists of two shutters or plugs.

It was noted that the cooling circuits with the electronic system thus designed did indeed take into account the various operating parameters of the engine but exhibited risks in the event of failure of the electric motor, of the mechanical transmission, or of the electronic control circuit. In such a case, what happens is that the movable shutoff means of the regulating valve may become jammed in a position which prevents passage of coolant via the radiator, and the coolant can then reach temperatures which are incompatible with operational safety.

The object of the invention is essentially to eliminate these risks.

SUMMARY OF THE INVENTION

A liquid cooling system for an internal combustion engine in accordance with the invention comprises: a cooling radiator; a first conduit for conveying hot cooling liquid from an engine to said radiator; a second conduit for conveying cold cooling liquid from said radiator to the engine; a branch conduit extending between said first and second conduits for conveying hot cooling liquid from said first conduit to said second conduit; a circulation pump for circulating cooling liquid from the engine through said first conduit means to said radiator, and through said second conduit means from said radiator to the engine; a regulating valve having a chamber, said regulating valve being positioned in said branch conduit for directing a portion of the hot cooling liquid from the engine in the first conduit to the said radiator and the remaining portion thereof to said second conduit; means for sensing the temperature of circulating cooling liquid; an electronic control system comprising: a temperature sensor sensitive to the temperature of circulating cooling liquid and capable of generating a signal representative of said temperature; at least one further sensor sensitive to an operating parameter of the engine other than said temperature of circulating cooling liquid and capable of generating a further signal representative of the value of said parameter; and a computer for receiving said signal and said further signal and for processing the received signals to generate an output signal based on the received signals; said regulating valve further comprising shutoff means for controlling the relative proportions of hot cooling liquid flowing from said engine through said first conduit and said branch conduit; an electric motor responsive to said output signal of said electronic control system for actuating said shutoff means to control the proportion of cooling liquid flowing from the engine to said cooling radiator relative to the proportion of cooling liquid flowing from the engine to said second conduit whereby the temperature of circulating cooling liquid is maintained at a nominal setting temperature determined by the output signal of said computer; a failsafe thermostatic safety capsule located in said chamber of said regulating valve, said capsule being responsive to the temperature of cooling liquid in said chamber, and being operatively connected to said shutoff means to actuate said shutoff means independently of the output signal of said electronic control system to convey at least a major portion of the cooling liquid from the engine to said cooling radiator only if the temperature in the mixing chamber exceeds said nominal setting temperature by a pre-determined amount.

In contrast to the cooling system described in the above-mentioned Document DE-A-3,415,876, the utilization of a thermostatic wax capsule, not in the form of a control member (according to Document FR-A-2,589,219) but in the form of a safety member, protects electronically controlled cooling circuit from incidents, the consequences of which could be extremely serious.

A further object of the invention is also to improve the cooling circuits of the type described in Document FR-A-2,589,219.

To this end, acts on the movable shutoff means of the latter so as to open the the first (cold) liquid inlet fully and to close the second (hot) liquid inlet in the case where the temperature of the warm liquid in the chamber of the mixing valve exceeds, by a predetermined amount, the temperature threshold for which the electronic system normally causes the first liquid inlet to be opened fully and causes the second liquid inlet to be simultaneously closed.

According to an advantageous embodiment, the electric motor is operatively connected to a mechanical transmission which comprises: a rotary sleeve which is rotationally driven by the electric motor and equipped with an internal screw thread; a rod which is engaged in the sleeve via an external screw thread matched to said internal screw thread and immobilized in terms of rotation but free to move axially with respect to the casing of the valve, the rotary sleeve being urged by elastic means against a stop providing it, in normal operation, with an invariable axial position, and the rod being set out so as to actuate the movable shutoff means such that in normal operation the rotational movements of the sleeve are manifested in translational movements of the threaded rod; and the thermostatic safety capsule is mounted in the mixing chamber so as to move the threaded rod and the sleeve in terms of translation, moving the latter away from its stop by deformation of the elastic means when the above-mentioned threshold is reached and exceeded.

DESCRIPTION OF PREFERRED EMBODIMENTS

The invention will now be explained in more detail with the aid of the appended drawings.

Figure 1:
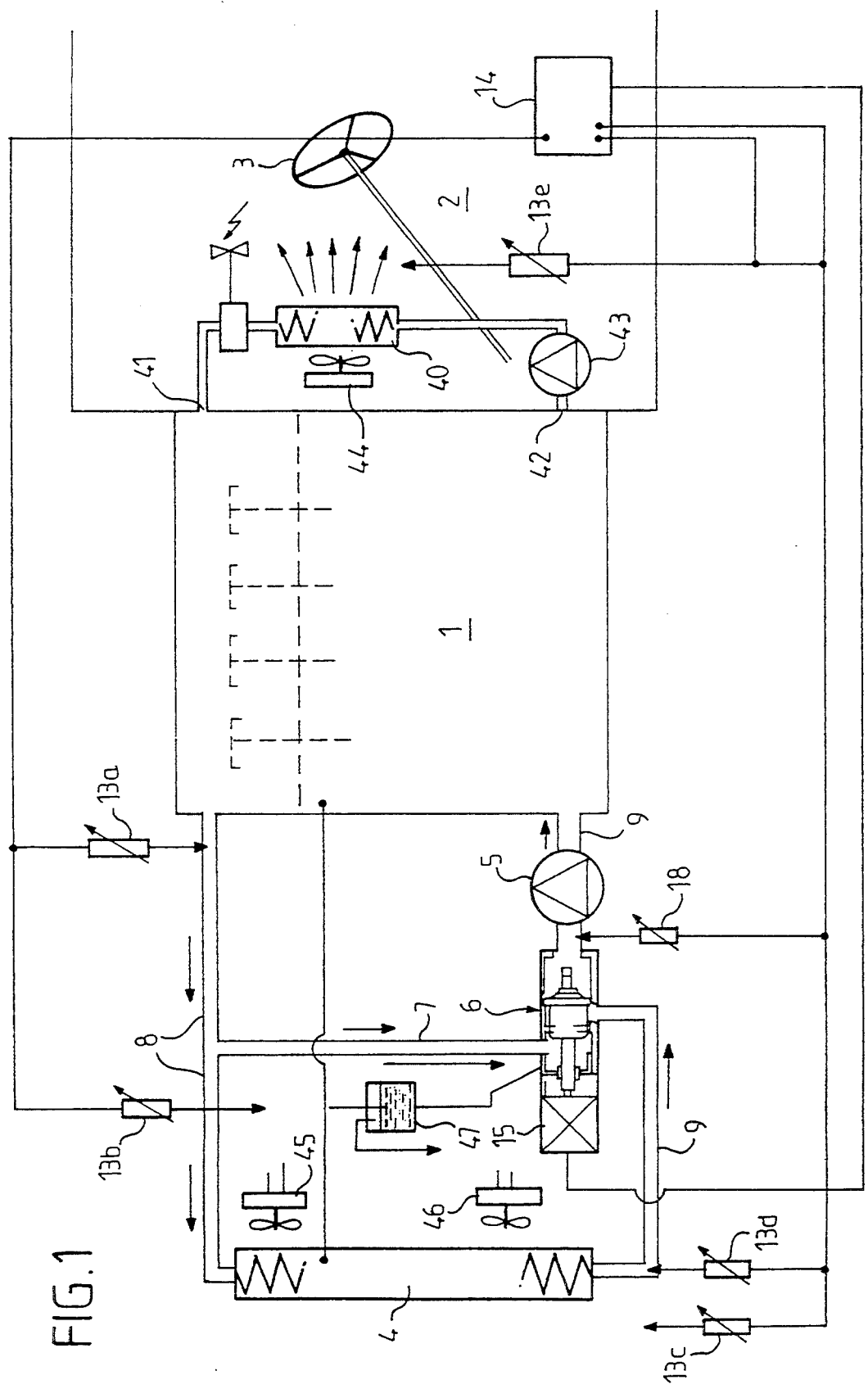
FIG. 1 represents, diagrammatically, an internal combustion engine equipped with a cooling circuit in accordance with the invention and also shows a part of a passenger compartment of a vehicle moved by said engine.

FIG. 1 shows an internal combustion engine 1, its cooling circuit and part of the passenger compartment 2 of the vehicle moved by engine 1, including steering wheel 3. The cooling circuit comprises a cooling radiator 4, a circulation pump 5 and a regulating valve 6. Valve 6 receives a branch conduit 7 established between a first pipeline conduit 8 of the cooling liquid circuit leading the hot cooling liquid from engine 1 to radiator 4 and a second pipeline conduit 9 of the circuit for flow of cold cooling liquid from radiator 4 to engine 1.

In known fashion, valve 6 may be situated either (as shown in FIG. 1) at the junction of branch 7 and return pipeline 9, in which case valve 8 constitutes a mixing valve, or at the junction of branch 7 and conduit 8 in which case valve 6 splits the flow of hot cooling liquid leaving the engine between conduit 8 leading to radiator 4, and conduit 9 leading to the engine.

In the illustrated embodiment, mixing valve 6 forms a warm liquid by mixing variable proportions of the hot liquid arriving through the conduit pipeline 8 and branch 7 and the cold liquid which leaves the radiator 4.

In the illustrated embodiment, valve 6 is a mixing valve in which cold cooling liquid admitted from a first section of conduit 9 through inlet 12 is mixed in mixing chamber 10 with hot cooling liquid admitted from branch 7 through inlet 11 to form a warm cooling liquid which is conveyed through a further section of conduit 9 to the engine. Under control of an electronic control system, the more that the temperature of the warm liquid in mixing chamber 10 rises, and taking into account at least one other operating parameter, the more that shutoff means in chamber 10 acts to open inlet 12 while simultaneously closing inlet 11, and vice versa.

The movable shutoff means of mixing valve 6, one example of which will be described hereinafter, is actuated by an electronic control system essentially consisting of a set of sensors 13 which are sensitive to various operating parameters of engine 1 and capable of emitting signals respectively representing the value of each of these parameters, of a computer 14 receiving and processing these signals and capable of generating an electric current taking account of these signals, of a reversible electric motor 15 receiving the electric current and comprising a member 16 which can move as a function of the current, and of a mechanical transmission connecting movable member 16 of the electric motor 15 to the movable shutoff means of mixing valve 6.

The sensors 13 may be sensitive to the following parameters: the temperature of the (hot) cooling liquid at the outlet from the internal combustion engine (sensor 13a); temperature prevailing under the hood of the engine 1 (sensor 13b); external temperature (sensor 13c); temperature of the (cold) cooling liquid at the outlet from the radiator 4 (sensor 13d); and temperature in the passenger compartment 2 (sensor 13e).

The electronic system which has just been described hereinabove operates in the following way: electric motor 15, generally equipped with reduction gear 17, maneuvers the movable shutoff means of the mixing valve 6 and makes it occupy a position which gives the temperature of the (warm) water leaving valve 6 a nominal setting value determined by the computer 14. The latter takes into consideration, according to a suitably defined algorithm, the internal and external parameters of the cooling circuit. The mixtures law adopted for each type of running of the vehicle driven by the engine 1 makes it possible to optimize the effectiveness of the cooling circuit, possibly decreasing fuel consumption and pollution, increasing the efficiency of the engine 1, etc. A temperature probe 18, situated at the inlet of the cooling liquid of the engine 1, will enslave, on the basis of an electronic control circuit, the function of the shutoff means of mixing valve 6, in order to obtain the nominal setting temperature which has been calculated and optimized by computer 14.

A safety thermostatic wax capsule 19, of known type, is located in chamber 10 of mixing valve 6 so as to be sensitive to the temperature of the "warm" liquid and to act on the movable shutoff means of mixing valve 6 so as to open the inlet for the cold liquid (orifice 12) fully and close the inlet of the hot liquid (orifice 11) only in the case where the temperature of the warm liquid exceeds an upper threshold, by a predetermined amount, of the temperature for which the electronic system normally causes the cold liquid inlet (orifice 12) to be opened fully and the hot liquid inlet (orifice 11) to be simultaneously closed.

Preferably, the above-mentioned preset threshold value for the temperature is of the order of 10° C. above the nominal setting temperature.

Figure 2:
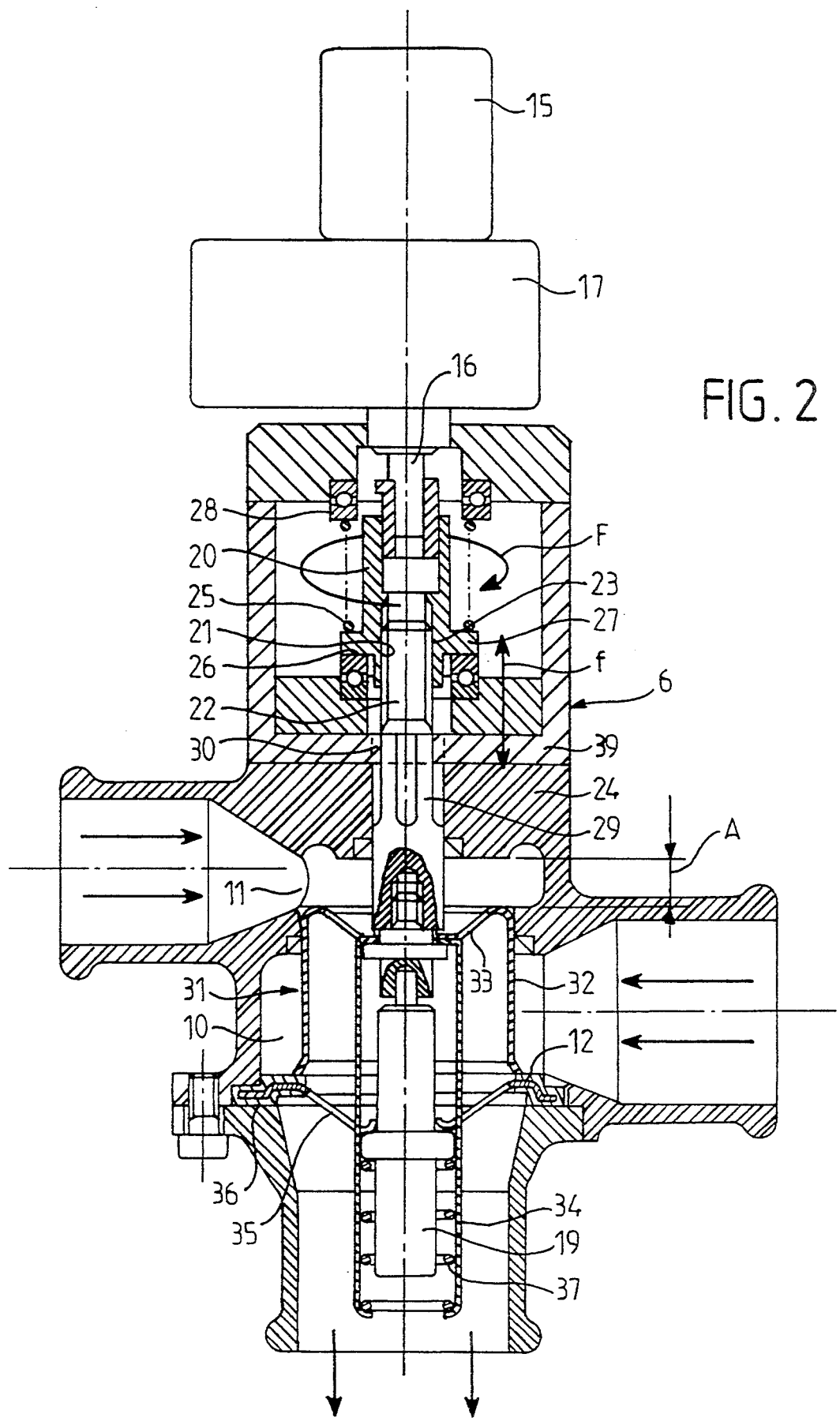
FIG. 2 shows, in a sectional view, a mixing valve forming part of the cooling circuit of FIG. 1.

According to a preferred embodiment, the above-mentioned mechanical transmission comprises: a rotary sleeve 20 which is rotationally driven in one direction or the other, represented diagrammatically by arrow "F" in FIG. 2, by the shaft 16 of the electric motor 15 and is equipped with an internal screw thread 21; and a rod 22 which is engaged in the sleeve 20 via an external screw thread 23 matched to the internal screw thread 21 and immobilized in terms of rotation but free to move axially (as represented diagrammatically by the double arrow "f" of FIG. 2) with respect to the casing 24 of mixing valve 6. Rotary sleeve 20 is urged, by elastic means such as a compression coil spring 25 surrounding sleeve 20, against a stop 26 which, in normal operation, gives sleeve 20 an invariable axial position (which position is shown in FIG. 2). Threaded rod 22 is mounted so as to actuate the movable shutoff means of the mixing valve 6 so that in normal operation rotational movements of the sleeve 20 result in translational movements of threaded rod 22. Thermostatic capsule 19, which is situated in the axial extension of rod 22, is mounted so as to move the threaded rod 22 and the sleeve 20 in terms of translation, moving the latter away from its stop 26 by deformation of the elastic means 25, when the above-mentioned threshold is reached and exceeded.

In order to allow spring 25 to accompany the rotation of sleeve 20, spring 25 bears between a shoulder 27 of sleeve 20 and a thrust ball bearing 28 or the like. Likewise, stop 26 may be a thrust ball bearing or the like.

In order to be immobilized in terms of rotation, threaded rod 22 has longitudinal splines 29 which slide in longitudinal grooves 30 formed in casing 24 or in a support 39 secured to casing 24.

According to an advantageous embodiment, the movable shutoff means of mixing valve 6 consists of a hollow plug 31 comprising a leaktight cylindrical skirt 32 connected to threaded rod 22 by spaced-apart radial arms 33. In the position represented in FIG. 2, plug 31 fully opens orifice 11 and allows the hot water to pass through valve 6, passing between the arms 33 and the inside of cylindrical skirt 32, whereas it shuts off cold water inlet orifice 12. When the temperature of the water leaving mixing valve 6 increases, computer 14 causes the shaft 16 of the electric motor 15 to rotate in a direction which, by interaction of the screw threads 21 and 23, normally raises plug 31, which progressively closes orifice 11 until it is completely closed and progressively opens orifice 12 until it is completely open (extreme position of the plug 31 represented in the right-hand part of FIG. 3).

Figure 3:
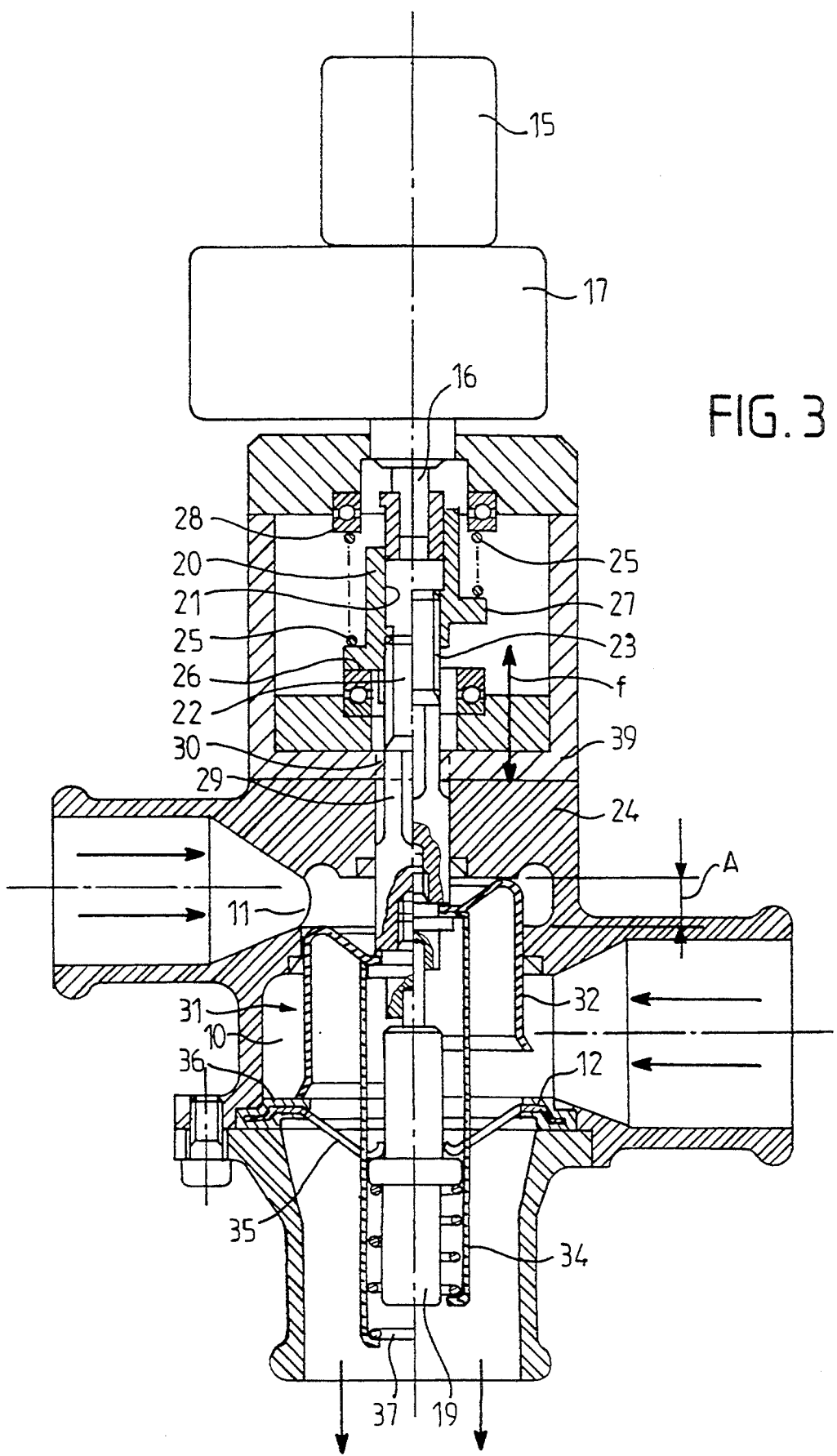
FIG. 3 illustrates, in a view similar to that of FIG. 2, the role of a thermostatic wax capsule.

In the event of failure of the motor 15 or of its electronic control system, plug 31 might become jammed in the position represented in the left-hand part of FIG. 3, allowing the liquid leaving mixing valve 6 to reach excessive temperatures, owing to the shutting-off of the cold liquid inlet orifice 12. The thermostatic capsule 19 then comes into play in order to lift plug 31, threaded rod 22 and sleeve 20, as one, thereby compressing spring 25, as shown in the right-hand part of FIG. 3.

As shown, capsule 19 may be housed in a cage 34, fixed rigidly inside plug 31, and is normally immobilized inside cage 34 by lugs 35 secured to a seat 36 with which plug 31 interacts. A spring 37, urging the capsule 19 against lugs 35, allows cage 34 firstly to follow the movements imposed on plug 31 by capsule 19, then to allow capsule 19 to continue to deform after plug 31 has covered its nominal path of travel "A".

In known fashion, a heating radiator 40, intended to heat the passenger compartment 2, takes off, at 41, from the cooling circuit, hot liquid which is returned at 42 to the cold part of the cooling circuit, with the aid of a pump 43, the air heated by radiator 40 being blown into the passenger compartment 2 by a fan 44. Finally, at 45 and 46, fans have been represented which are intended to blow cooling air through the radiator 4, and a conventional vapor separator has been represented at 47.

The invention is, of course, not limited to the embodiment which has just been described and encompasses variants thereof which are within the expertise of skilled men. It could, in particular, easily be adapted to the embodiment described in the aforementioned Document DE-A-3,415,876 as regards both the mechanical transmission between the electric motor and the movable shutoff means of the regulating valve and as regards the make-up of the cooling circuit. In this circuit, regulating valve 6, which is not a mixing valve, is placed at the junction of branch 7 with pipeline 8 and its movable shutoff means split, in known fashion, the flow of hot cooling liquid coming from the internal combustion engine 1 into partial flows, of variable proportions, which they convey towards the radiator 4 and towards conduit 9 for return to the engine.

What is claimed is:

1. A liquid cooling system for an internal combustion engine comprising:
   (A) a cooling radiator;
   (B) a first conduit for conveying hot cooling liquid from an engine to said radiator;
   (C) a second conduit for conveying cold cooling liquid from said radiator to the engine;
   (D) a branch conduit extending between said first and second conduits for conveying hot cooling liquid from said first conduit to said second conduit;
   (E) a circulation pump for circulating cooling liquid from the engine through said first conduit means to said radiator, and through said second conduit means from said radiator to the engine;
   (F) a regulating valve having a chamber, said regulating valve being positioned in said branch conduit for directing a portion of the hot cooling liquid from the engine in the first conduit to said radiator and the remaining portion thereof to said second conduit;
   (G) means for sensing the temperature of circulating cooling liquid conveyed to the engine;
   (H) an electronic control system comprising:
      (a) a temperature sensor sensitive to the temperature of circulating cooling liquid conveyed to the engine and capable of generating a signal representative of said temperature;
      (b) at least one further sensor sensitive to an operating parameter of the engine other than said temperature of the circulating cooling liquid conveyed to the engine and capable of generating a further signal representative of the value of said parameter; and (c) a computer for receiving said signal and said further signal and for processing the received signals to generate an output signal based on the received signals;

(I) said regulating valve further comprising shutoff means for controlling the relative proportions of hot cooling liquid flowing from said engine through said first conduit and said branch conduit;

(J) an electric motor responsive to said output signal of said electronic control system for actuating said shutoff means to control the proportion of cooling liquid flowing from the engine to said cooling radiator relative to the proportion of cooling liquid flowing from the engine to said second conduit whereby the temperature of circulating cooling liquid conveyed to the engine is maintained at a nominal setting temperature determined by the output signal of said computer;

(K) a failsafe thermostatic safety capsule located in said chamber of said regulating valve, said capsule being responsive to the temperature of cooling liquid in said chamber, and being operatively connected to said shutoff means to actuate said shutoff means independently of the output signal of said electronic control system to convey at least a major portion of the cooling liquid from the engine to said cooling radiator only if the temperature in the mixing chamber exceeds said nominal setting temperature by a pre-determined amount.

2. A cooling system as claimed in claim 1 wherein said regulating valve is located at the junction of said branch conduit and said second conduit and has a first inlet for admitting into said chamber cold cooling liquid conveyed from said radiator through a section of said second conduit, a second inlet for admitting into said chamber hot cooling liquid conveyed from said first conduit through said branch conduit for mixing with said cold cooling liquid in said chamber to form a warm cooling liquid, and an outlet for conveying said warm cooling liquid to the engine through a further section of said second conduit.

3. A cooling system as claimed in claim 2 wherein said shutoff means comprises means for simultaneously opening said first inlet and closing said second inlet and vice versa.

4. A cooling system according to claim 3 wherein said capsule is operatively connected to said shutoff means to fully open said first inlet and to fully close said second inlet only when the temperature in the mixing chamber exceeds said nominal setting by said pre-determined amount.

5. A cooling system as claimed in claim 1 wherein said pre-determined amount is about 10° C.

6. A cooling system as claimed in claim 5 wherein said stop comprises a rolling-contact thrust bearing.

7. A cooling system as claimed in claim 1 wherein said electric motor is operatively connected to said shutoff means by a mechanical transmission which comprises: a rotary sleeve connected to said shutoff means, said sleeve being rotationally driven by the electric motor and equipped with an internal screw thread; a rod which is engaged in the sleeve via an external screw thread matched to said internal screw thread and immobilized in terms of rotation but free to move axially with respect to the regulating valve; elastic means urging the rotary sleeve against a stop for providing the rotary sleeve, in normal operation, with an invariable axial position; whereby said rod actuates the shutoff means such that in normal operation rotational movements of the sleeve result in translational movements of the threaded rod.

8. A cooling system as claimed in claim 7 wherein said thermostatic safety capsule is mounted in said mixing chamber to move the threaded rod and the sleeve in terms of translation, moving the latter away from said stop by deformation of said elastic means when the temperature in said mixing chamber exceeds said nominal setting temperature by said pre-determined amount.

9. A cooling system as claimed in claim 8 wherein said elastic means comprises a compression spring surrounding said sleeve.

10. A cooling system as claimed in claim 9 wherein said compression spring is mounted between a shoulder of said sleeve and a rolling-contact thrust bearing.

11. A cooling system as claimed in claim 1 wherein said shutoff means comprises a plug having a cylindrical skirt attached to said plug by a plurality of radial arms.

12. A cooling system as claimed in claim 1 wherein said capsule is spring-mounted within a cage, said cage being connected to said shutoff means.

13. A cooling system as claimed in claim 12 wherein said shutoff means comprises a plug, and wherein said cage is connected to said plug.

14. A cooling system as claimed in claim 12 wherein said capsule is positioned in the axial extension of said threaded rod.

* * * * *